UNITED STATES PATENT OFFICE.

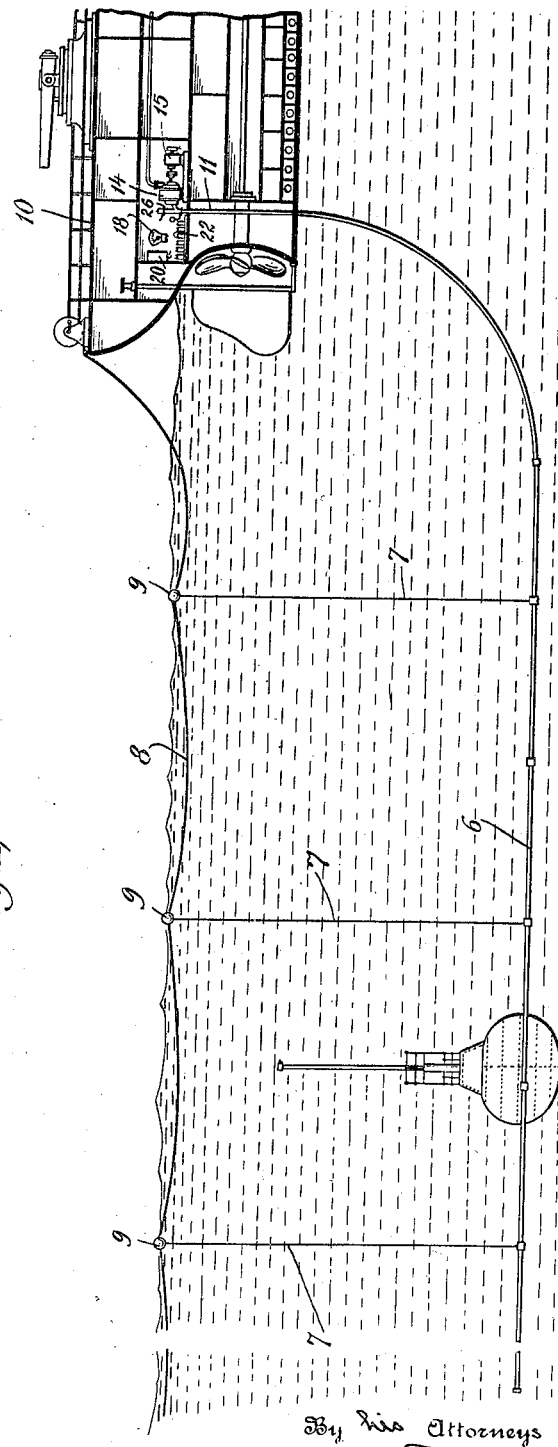

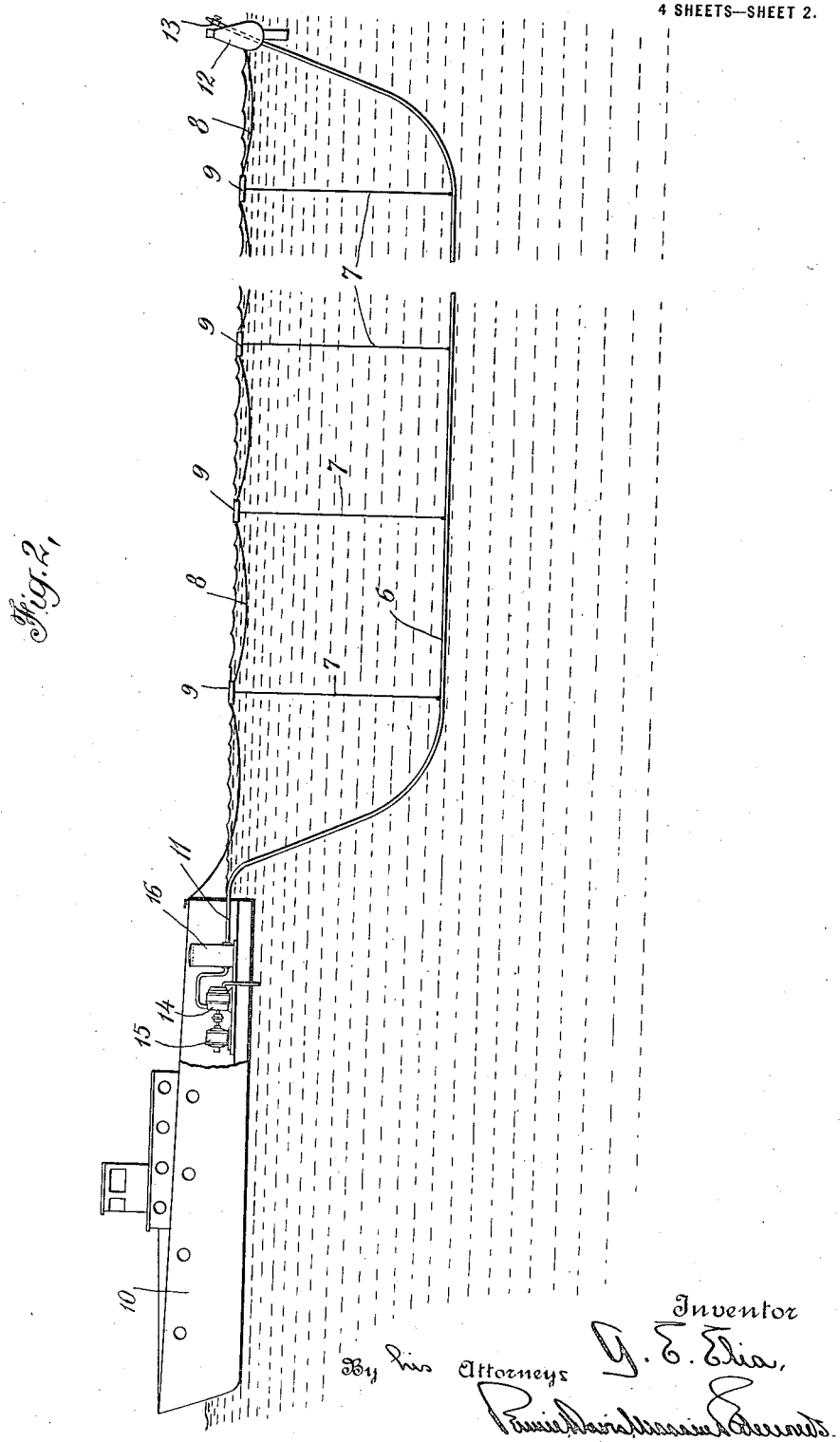

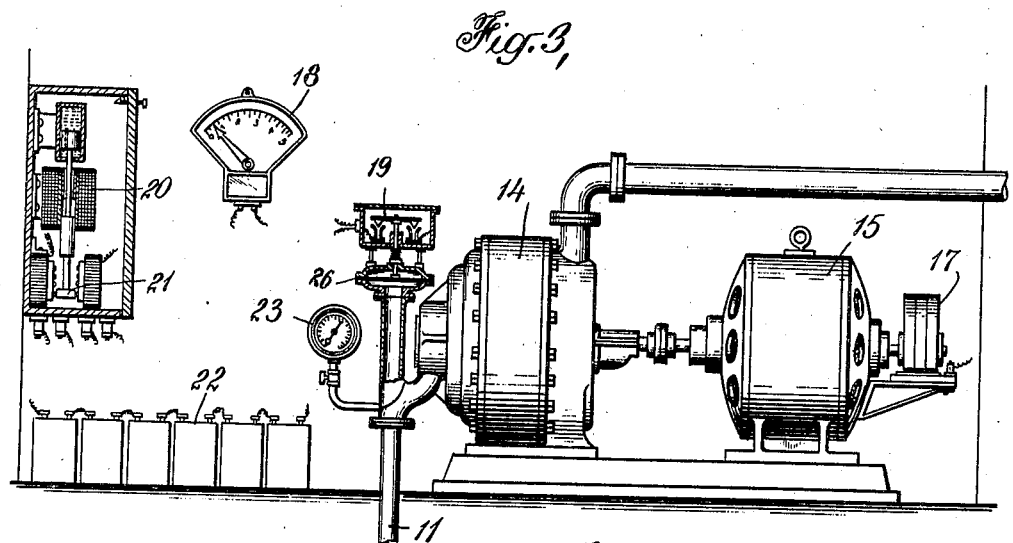
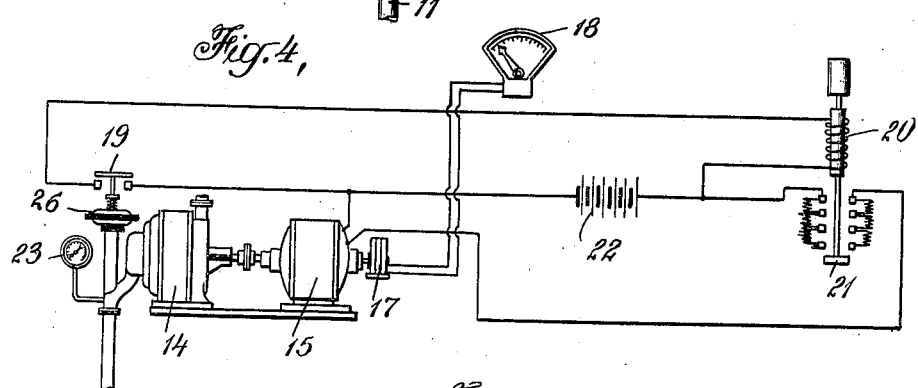
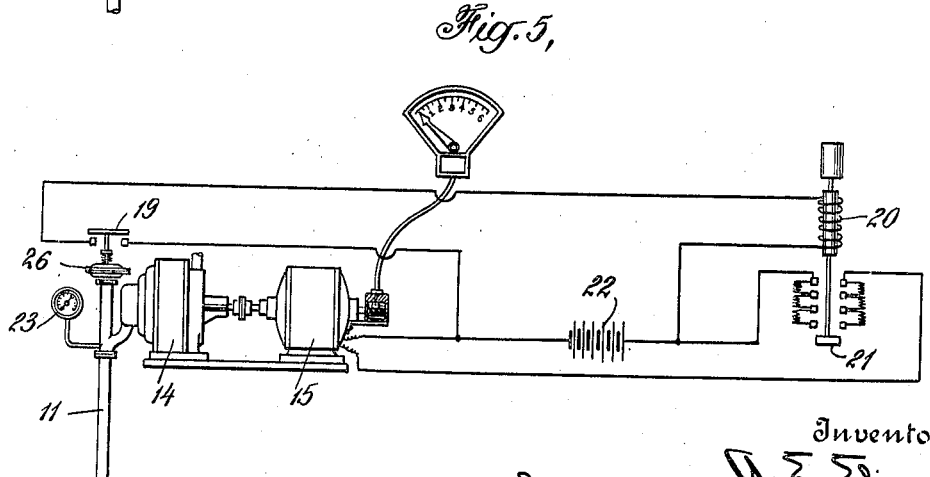

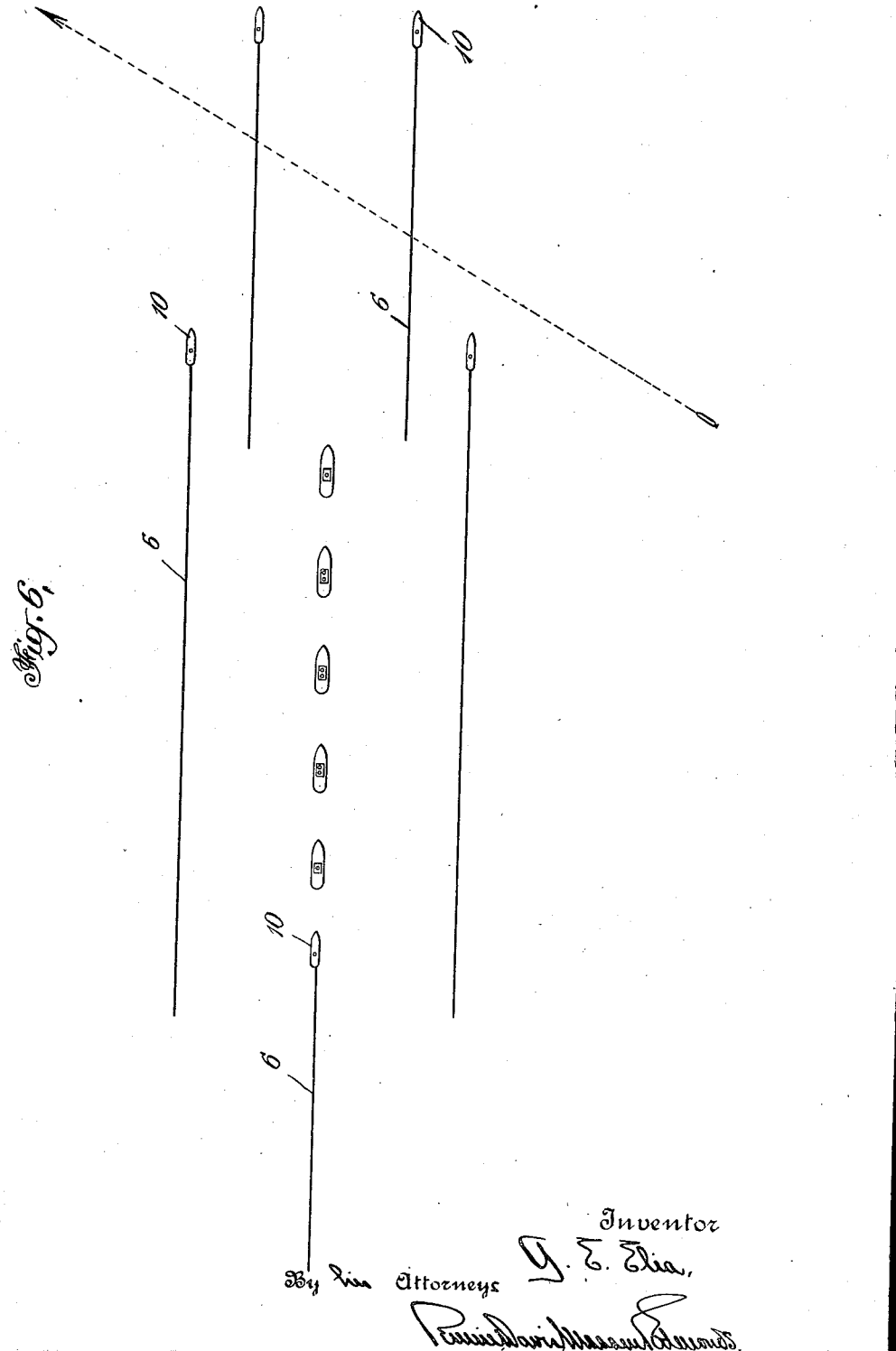

GIOVANNI EMANUELE ELIA, OF FORTRESS MONROE, VIRGINIA.

SUBMARINE-BOAT-DETECTION APPARATUS.

1,321,998.   Specification of Letters Patent.   Patented Nov. 18, 1919.

Application filed July 13, 1918. Serial No. 244,809.

*To all whom it may concern:*

Be it known that I, GIOVANNI EMANUELE ELIA, a subject of the King of Italy, temporarily residing at Fortress Monroe, in the county of Elizabeth City, State of Virginia, have invented certain new and useful Improvements in Submarine-Boat-Detection Apparatus; and I do hereby declare the following to be a full, clear, and exact description of the invention, such as will enable others skilled in the art to which it appertains to make and use the same.

This invention relates to apparatus for detecting and indicating the presence of submarine boats. The invention involves the provision of a tube which is submerged at a substantial distance below the level of the sea, which extends out a considerable distance from any suitable receiving station and which is filled with a fluid maintained under pressure. When any break occurs in the tube by engagement of a submarine boat therewith, the pressure of the fluid within the tube is released or reduced and this decline in the pressure of the fluid within the tube may be utilized in any suitable manner to give an indication at the receiving station of the fact that the tube has been broken. Furthermore, the fluid in the tube and the apparatus for maintaining it under pressure may be such that the indicating devices may be arranged to indicate with sufficient accuracy the point in the length of the tube at which the break occurred, thus disclosing the location of the submarine boat with such a degree of accuracy as will permit of exploding a charge close enough to the submarine boat to effect its destruction.

I have found that a tube of about one-half inch in diameter is sufficient to carry the fluid under pressure. This tube may be of very considerable length. In order to hold it at the proper depth of immersion and relieve it of excessive strain, the tube is preferably suspended from a cable by a multiplicity of short suspension cables spaced at intervals along the length of the tube and the long sustaining cable has floats secured to it at intervals throughout its length for maintaining it upon or near the surface of the water. By reason of the relatively small size and weight of the tube, the sustaining cable and its floats may be of relatively small size so that the chance of observation of the detection apparatus by a hostile submarine boat is small.

Preferably water is used as the fluid with which the detection tube is filled. The use of water as the fluid is especially desirable because it is practically non-compressible. The station at which the indications of the apparatus are received preferably includes an engine driven pump which is operated to fill the tube with water and raise the pressure of the water in the tube to the desired point. The motor driven pump is preferably maintained in condition for operation throughout the period of use of the apparatus; when the pressure of water within the tube has been raised to the desired point, the pump will come to rest or will operate only at very low speed to maintain the desired pressure by compensating for such leakage as may take place. However, at any time when breakage of the tube takes place, the pressure of the water within the tube will be instantly reduced, and the pump, being in condition for immediate operation, will start operation and by its operation indicate that a break in the tube has occurred.

When the tube is of considerable length and of a diameter approximating one-half inch, there is considerable frictional resistance to the flow of water through the tube. The construction and capacity of the pump may be such that this frictional resistance to the flow of water through the tube will react upon the pump and determine its speed of rotation. The speed of the pump may, therefore, be employed as an indication of the distance of the break in the tube from the receiving station. For this purpose the pump may be provided with an indicating instrument, either electrical or mechanical, whose index moves in response to changes in the speed of the pump, and the scale plate of this instrument may be calibrated to read in units of lengths of the tube so as to indicate the distance of the break in the tube from the receiving station.

The receiving station is preferably on board a ship, the pressure tube and its sustaining cable being towed along through the water by the ship. If the ship be equipped for the destruction of submarine boats, as by carrying a supply of depth charges, means may be provided for rapidly disconnecting the pressure tube and the sustaining cable from the ship so that immediately upon the receipt of an indication of the presence of a submarine boat, the detection apparatus trailing behind the boat may be disconnected and allowed to float in the sea while the boat proceeds to the indicated locality and drops a destructive charge. The apparatus may also be employed in connection with stationary receiving stations as by providing pressure tubes radiating from a shore station or from an anchored ship. In the latter case, the pressure tubes with their sustaining cables will drift with tidal or other currents and a pressure tube may thus be carried into engagement with, and be broken by a submarine boat which is not under way, or with an anchored mine. Under such conditions, an indication will be given at the receiving station just as a signaling apparatus towed by a moving ship would give an indication in response to a break occasioned by a submarine boat under way.

The principles of my invention above outlined will be better understood by reference to the following description in connection with the annexed drawings which illustrate forms in which the invention may be embodied. In these drawings Figure 1 is a view of a portion of the apparatus showing a submarine boat about to engage the pressure tube; Fig. 2 is a similar view of the complete apparatus; Fig. 3 is a sectional elevation of the apparatus at the receiving station; Figs. 4 and 5 are diagrams showing electrical connections which may be employed and two different forms of indicating instruments; and Fig. 6 is a diagrammatic view illustrating one manner in which the detection apparatus may be employed in connection with a convoy.

Referring first to Figs. 1 and 2, the pressure tube is indicated at 6. It is of considerable length and throughout its length it is suspended at a predetermined distance below the surface of the sea by a multiplicity of suspension cables 7 connected at their upper ends to a sustaining cable 8. This cable 8 has small buoys 9 secured to it at intervals throughout its length so that the cable is maintained at or near the surface of the sea. The pressure tube 6 may be of small size, approximately one-half inch, so that the weight sustained by the cable 8 is relatively small and the cable may be of correspondingly small size, thus decreasing the chance of detection of the apparatus. The pressure tube with its sustaining cable is shown as arranged to be towed through the water by a ship 10, the end of the cable 8 being made fast to the ship and the end of the pressure tube 6 being connected to a pipe 11 entering the hull of the ship. The distant end of the tube is preferably brought up to the surface as shown in Fig. 2 and connected to a float 12. This end of the tube is preferably provided with a cock 13 to permit of releasing air from the tube when filling the tube with water initially.

Water or any other suitable fluid, preferably a fluid which is non-compressible, is forced into the pressure tube 6 by a pump 14 on the ship 10. This pump may be of any suitable form; it is shown in Figs. 1 and 2 as a rotary pump driven by an electric motor 15. A tank 16 is preferably inserted in the pipe 11 leading from the pump 14 to the pressure tube 6 to provide an air cushion and storage reservoir.

In using the apparatus, the tube 6 is filled with water and the pump 14 is operated until the water throughout the length of the tube 6 is subjected to a predetermined pressure. Power may be continuously applied to the motor 15 so that the pressure of the water in the pipe 11 and tube 6 is maintained continuously and the pump is in readiness for instant operation at increased speed in response to any decline in the pressure of the water in tube 6. The arrangement of the apparatus may be such that when the pressure of the water in tube 6 has been brought up to a definite point by the operation of the pump, the movement of the movable member of the pump will be stopped automatically but the continuous application of power to the movable member of the pump will cause it to resume operation instantly when the pressure of the water in tube 6 falls off by reason of a break in the tube. Or, the arrangement of the apparatus may be such that the movable member of the pump will operate at low speed continuously to maintain the water pressure and compensate for any leakage which may take place and when a break in the tube occurs, the movable member of the pump will instantly operate at a much higher speed.

A break in the tube would be sufficiently indicated by the increased speed of operation of the movable member of the pump and the attention of the operator would be called by the different sound incident to such increased speed of operation. If desired, however, a suitable indicating instrument and signaling device may be employed for attracting the attention of the operator when the pump operates at increased speed and giving a suitable indication. In Figs. 3, 4 and 5 the pump for maintaining the water pressure is shown at 14 and its motor at 15. In Figs. 3 and 4 the shaft of the motor 15 is shown as connected to the armature of a small electric generator 17 having its windings connected to an indicating instrument 18 in the form of a volt meter whose scale is calibrated to read in units of speed of the operation of the pump 14 or units of length of the pressure tube 6 as hereinafter pointed out. In Fig. 5, the connection from the motor 15 to the indicating instrument 18 is a mechanical one instead of an electrical one, the instrument being in the form of a tachometer having its scale suitably calibrated.

In the form in which the apparatus is illustrated in Figs. 1 and 2, the circuits of the driving motor 15 are assumed to be closed continuously during the period of use of the apparatus so that the movable member of the pump will be in readiness continuously for instant operation or instant increase in speed of operation in response to a break in the pressure tube. If desired, however, the circuits of the motor may be open and arranged for closure automatically and instantaneously in response to a drop in the pressure existing within the pressure tube by reason of a break in the tube. For instance, in Fig. 3 the pipe 11 leading from the pump 14 to the pressure tube 6 is shown as provided with a diaphragm valve 26 whose diaphragm is arranged to respond to changes of pressure existing within the pipe 11 and actuates the movable member 19 of an electric switch in one of the circuits of the motor 15. In Figs. 4 and 5 the switch member 19 is shown as controlling the circuit of a solenoid 20 whose core is connected to the movable arm 21 of a rheostatic controller. A drop in the pressure within the pipe 11 allows the switch contact 19 to close the circuit through solenoid 20 and source 22 of supply of electric energy. The solenoid immediately draws the member 21 of the rheostatic controller upward to first close the circuit of the motor 15 and then cut resistance out of that circuit to start the motor in the usual manner.

As heretofore stated, the pressure tube 6 is preferably about one-half inch in diameter so that there is substantial frictional resistance to the flow of water through the tube and variation of the frictional resistance over an extended range with variations in the length of the tube. This may be utilized to give an indication of the location of a break in the tube as the frictional resistance will vary directly with the distance from the pump to the break. Thus, the apparatus may be such that the speed of operation of the motor driven pump will vary with the resistance to the flow of water forced into the tube by the pump and therefore an indicating instrument having its index arranged to move in accordance with changes in the speed of rotation of the motor may have its scale plate calibrated in units of length of the pressure tube so that the instrument will read directly in distance from the pump to a break in the tube. Or, if a constant speed motor be employed the pressure in the pipe 11 will vary with the frictional resistance to flow of water through the pressure tube 6 and a pressure gage 23 connected to the pipe 11 may have its scale plate calibrated in units of length of the pressure tube.

The apparatus is preferably employed by towing it in the manner indicated in Figs. 1 and 2. For the protection of a convoy, the apparatus may be employed as indicated in Fig. 6. In this latter figure the ships of the convoy are shown as arranged in line and guard ships are disposed on either side of this line in advance of the leading ship of the convoy, each of the guard ships towing a protecting pressure tube extending back a considerable length, preferably at least as long as the column of ships of the convoy. Also, in connection with Fig. 6, attention is directed to the fact that when two of the protective devices are employed in parallel relation the course of a hostile submarine boat may be ascertained by the positions of breaks in the two tubes. Thus, in Fig. 6, leading guard ships are shown towing protective pressure tubes in parallel relation. The dotted line indicates the course of a hostile submarine boat and the distances from the two guard ships to the breaks in their protective pressure tubes would give two points in the course of the submarine boat. In addition to such use of the protective apparatus propelled by a ship, the apparatus may be placed in the sea extending out from a shore station or an anchored ship station. When so employed, the protective tube would drift with tidal or other currents and if such drifting carried it into engagement with a submarine boat not under way or with an anchored mine the break in the pressure tube occasioned thereby would give an indication just as in the case of a break occasioned by a moving submarine boat.

I claim—

1. Submarine boat detection apparatus comprising a tube of substantial length adapted to be placed in the sea, a fluid in the tube and means for subjecting the fluid to pressure so that a break in the tube effected by a submarine boat will relieve the pressure and thus give an indication.

2. Submarine boat detection apparatus comprising a tube of substantial length adapted to be submerged in the sea, floats for sustaining the tube in position, a fluid under pressure within the tube and indicating means responsive to a decline in the said pressure incident to a break in the tube.

3. Submarine boat detection apparatus comprising a tube of substantial length adapted to be submerged in the sea, a sustaining cable paralleling the tube, floats secured to the cable, cables suspending the tube from said cable and a pump for maintaining a fluid in the tube under pressure.

4. Submarine boat detection apparatus comprising a tube of substantial length adapted to be submerged in the sea, a pump connected to the tube for maintaining a fluid in the tube under pressure, and a pressure-operated indicator connected to the tube adjacent to the pump for indicating the pressure of the fluid.

5. Submarine boat detection apparatus comprising a tube of substantial length adapted to be submerged in the sea, a pump connected to the tube for maintaining a fluid in the tube under pressure and an indicator connected to the pump and having its index movable in accordance with changes in the speed of the pump.

6. Submarine boat detection apparatus comprising a tube of substantial length adapted to be submerged in the sea, a pump connected to the tube for maintaining a fluid in the tube under pressure, an electric motor driving the pump, and a pressure-operated switch connected to the tube to respond to changes of the pressure of the fluid therein and controlling a circuit of the motor.

In testimony whereof I affix my signature.

GIOVANNI EMANUELE ELIA.